(12) United States Patent
Guo et al.

(10) Patent No.: US 10,847,804 B2
(45) Date of Patent: Nov. 24, 2020

(54) CARBON NANOSPHERE MODIFIED CURRENT COLLECTOR FOR LITHIUM METAL BATTERY AND METHOD FOR PREPARING THE SAME

(71) Applicant: INSTITUTE OF CHEMISTRY, CHINESE ACADEMY OF SCIENCES, Beijing (CN)

(72) Inventors: Yuguo Guo, Beijing (CN); Huan Ye, Beijing (CN); Yaxia Yin, Beijing (CN)

(73) Assignee: INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 124 days.

(21) Appl. No.: 16/064,852

(22) PCT Filed: Apr. 25, 2016

(86) PCT No.: PCT/CN2016/080143
§ 371 (c)(1),
(2) Date: Jun. 21, 2018

(87) PCT Pub. No.: WO2017/124659
PCT Pub. Date: Jul. 27, 2017

(65) Prior Publication Data
US 2019/0020037 A1   Jan. 17, 2019

(30) Foreign Application Priority Data

Jan. 19, 2016  (CN) .......................... 2016 1 0035653

(51) Int. Cl.
*H01M 4/66* (2006.01)
*H01M 4/80* (2006.01)
(Continued)

(52) U.S. Cl.
CPC ......... *H01M 4/663* (2013.01); *H01M 4/0404* (2013.01); *H01M 4/0428* (2013.01);
(Continued)

(58) Field of Classification Search
CPC .. H01M 4/663; H01M 4/0404; H01M 4/0428; H01M 4/80; H01M 10/052; H01M 10/0525
(Continued)

(56) References Cited

U.S. PATENT DOCUMENTS

| | | | | |
|---|---|---|---|---|
| 5,723,232 A | * | 3/1998 | Yamada ................. | H01M 4/02 429/231.8 |
| 2012/0034463 A1 | * | 2/2012 | Endo ...................... | B82Y 30/00 428/402 |

(Continued)

FOREIGN PATENT DOCUMENTS

| | | |
|---|---|---|
| CN | 101661840 A | 3/2010 |
| CN | 102931437 A | 2/2013 |

(Continued)

OTHER PUBLICATIONS

Gao et al., Chemical activation of carbon nano-onions for high-rate supercapacitor electrodes, Aug. 2012, Carbon, 51, 52-58 (Year: 2012).*

(Continued)

*Primary Examiner* — Sean P Cullen
(74) *Attorney, Agent, or Firm* — Novick, Kim & Lee, PLLC; Allen Xue

(57) ABSTRACT

The present invention related to a method for preparing carbon nanospheres modified current collector and its application in metal secondary battery. The said method includes the preparation of carbon nanospheres modified current collector by chemical vapor deposition process and the process for loading metal into the modified current collector (Continued)

as an anode. Comparing with the bare Ni, the said anode with modified current collector demonstrates enhanced stripping/plating efficiency, well confinement of Li dendrite, stable long lifespan and strengthen safety.

7 Claims, 10 Drawing Sheets

(51) Int. Cl.
*H01M 10/052* (2010.01)
*H01M 4/04* (2006.01)
*H01M 10/0525* (2010.01)
*B82Y 40/00* (2011.01)

(52) U.S. Cl.
CPC ........... *H01M 4/80* (2013.01); *H01M 10/052* (2013.01); *H01M 10/0525* (2013.01); *B82Y 40/00* (2013.01)

(58) Field of Classification Search
USPC ........................................................ 429/245
See application file for complete search history.

(56) References Cited

U.S. PATENT DOCUMENTS

| | | | |
|---|---|---|---|
| 2014/0065494 A1* | 3/2014 | Fujita | H01M 8/16 429/401 |
| 2016/0013462 A1* | 1/2016 | Cui | H01M 4/1395 429/126 |
| 2016/0293346 A1* | 10/2016 | Xiong | H01G 11/26 |

FOREIGN PATENT DOCUMENTS

| | | |
|---|---|---|
| CN | 103000906 A | 3/2013 |
| CN | 103253648 A | 8/2013 |
| CN | 104577059 A | 4/2015 |
| CN | 104609392 A | 5/2015 |

OTHER PUBLICATIONS

Fabio Parigi, Fabrication and Modeling of Electrochemical Double-Layer Capacitors Using Carbon Nano-Onion Electrode Structures, 2013, Theses, Dissertations, and Student Research from Electrical & Computer Engineering, 48 (Year: 2013).*

* cited by examiner

CARBON NANOSPHERE MODIFIED CURRENT COLLECTOR FOR LITHIUM METAL BATTERY AND METHOD FOR PREPARING THE SAME

TECHNICAL FIELD

The present invention relates to a modified current collector, comprising a 3D porous structure and carbon nanospheres modified layers, its application in lithium metal-based batteries and a method for preparing said current collector.

BACKGROUND ART

Lithium metal is an attractive anode material due to its high specific capacity of 3860 mA h g$^{-1}$ and the lowest reduction potential (−3.04 V vs the standard hydrogen electrode, $H_2/H^+$). However, dendrite growth, side reactions, low coulombic efficiency and infinite relative volume change have prevented it from the commercial application of lithium metal-based batteries (such as Li—S and Li—$O_2$ batteries). Optimization of electrolyte has been demonstrated to be feasible in solving the foregoing problems because Li is highly reactive in liquid electrolyte. Li reacts with electrolyte, resulting in the formation of an insoluble layer of solid electrolyte interphase (SEI) as well as extra consumption of Li metal and electrolyte, demonstrating a low Coulombic efficiency. Solid electrolytes, such as polymers and ceramics have been explored to suppress dendrite formation and block their growth due to their large mechanical strength. However, the low ionic conductivity and high interfacial impedance is far from the high power requirement. Studies have been focused on liquid electrolytes by using electrolytes additives and optimal solvents and Li salts for the stabilization of SEI. Various electrolyte additives, including vinylene carbonate (VC), fluoroethylene carbonate (FEC), lithium fluoride (LiF), metal ions (Cs+, Rb+) and lithium bis(fluorosulfonyl)imide (LiFSI) have been applied to stabilize the interface between Li metal and electrolyte. Though somewhat effective could achieve, most additives will be continuously consumed during battery cycling so that the suppression effect is not fully sustainable. Moreover, the protective layers are brittle and have limited physical cohesion with the metal surface. Hence, artificial SEI protective layers, such as carbon nanospheres layers, hexagonal boron nitride/graphene, a graphite layer and polymer nanofiber are employed to restrain dendrite growth and thus improve the cycling Coulombic efficiency by stabilizing the interface between the Li and electrolyte. However, these physical barriers have weak cohesion with lithium metal.

Although the strategy by strengthening the intrinsic SEI or building a new artificial layer to inhibit Li dendrite growth has led to a certain improvement, the inhomogeneous deposition of Li remains unresolved. In the context of the Li morphology-dependency of the charge distribution over the entire electrode surface, it is expected that uniform distribution of ionic flux from the origin results in homogeneous Li plating. To resolve the above-mentioned problems, the present invention demonstrates a novel electrode design by depositing carbon nanospheres on top of the Ni foam substrate to tune the morphology of Li and suppress the growth of Li. The carbon nanospheres modified electrode with high electroactive surface area and high conductive could guide the lithium ions to form uniform lithium metal deposits confined on the carbon nanospheres surface and in the carbon nanospheres graphite space. With Li-metal restrained on the 3D current collector modified with carbon nanosphere, we showed enhanced safety and stable cycling of lithium metal anode.

Chemical vapor deposition (CVD) was performed to prepare carbon nanosphere modified Ni foam, which has been reported to prepare graphene and CNTs in previous literatures. In the patent of CN103253648A, CNTs were prepared by using metal catalyst (such as Ni, Cu, Fe etc.). The introduction of catalyst to the growth of CNTs would result in the introduction of impurities at the same time. Moreover, the pre-treatment of substrate and subsequent purification of the as-obtained material lead to more complicated process and a waste of resources. Because of that the CNTs grow along the point of catalyst, the interaction between CNTs and substrate is weak which could lead to the stripping of CNTs from the substrate. Therefore, the as-prepared CNTs demonstrate poor consistency. The patent of CN101661840A, CN104577059A and CN102931437A reported the directly growth of CNTs and graphene on the Ni foam substrate at high vacuum. But they may suffer from high energy consumption, and material limitations of the substrate and apparatus. Besides, the as-prepared graphene and CNTs are of high graphitic degree, small space distance and dense structure, which is not suitable for accommodating metal.

The current Li metal secondary batteries with excessive Li as anode have been plagued with the problem of serious safety concerns originated from the formation and growth of Li dendrite and low energy density due to the introduction of extra weight from the most unreactive Li. To resolve the abovementioned problems, a new Li metal secondary full battery with remarkable properties is constructed by the Li-modified Ni foam anode with 5% of Li excess than that cathode coupled with Lithium iron phosphate cathode. The new design of the as-assembled Li metal secondary cell with the Li-modified Ni foam anode ensures good security and long lifespan as well as high energy density.

SUMMARY OF THE INVENTION

In light of the above, one of the objects of the present invention is to provide an anode current collector for metal-based secondary batteries, the said current collector refers to the carbon nanospheres modified three-dimension (3D) porous current collector. Comparing with the conventional planar current collector (such as Cu foil) and bare 3D current collector (Ni foam, Cu foam, Al foam, Ti foam), the said carbon nanospheres modified 3D porous current collector could prevent the formation of Li dendrite during electrochemically stripping/plating process, and thus improve the safety of metal anode. In addition, the lithium anode with the said carbon nanospheres modified current collector demonstrates high Coulombic efficiency, superior cycling performance and small voltage hysteresis. Comparing with the prior art carbon nanotubes and graphene modified 3D porous current collector, the preparation method of carbon nanospheres modified 3D porous current collector according to the present invention demonstrates simplicity and easy implementation. Besides, there is no need to introduce catalyst and maintain high vacuum during the synthesis of carbon nanospheres, which demonstrates low energy consumption. The interaction between carbon nanospheres and substrate is stronger, which could not lead to the stripping of carbon nanospheres from the substrate. Therefore, the as-prepared products demonstrate good consistency. The carbon spheres are of moderate graphitic degree, which is much suitable for loading metal anode and can be extended to various metal anode.

The present invention provides the anode current collector for metal-based secondary batteries, comprising a 3D porous current collector substrate which is modified by carbon nanospheres. Preferably, the said metal-based secondary batteries refer to lithium, sodium and magnesium or the combination therefore of them directly loaded into said current collector as anode in metal secondary battery. Preferably, the said 3D current collector can be selected form 3D Al foam, 3D Cu foam, 3D Ni foam and 3D Ti foam, more preferably 3D Ni foam.

A method for preparing said 3D porous current collector is also provided in the present invention. The general preparation process is listed below: the commercial 3D porous current collectors (such as Ni foam) were first washed and then dried. Then the dried Ni foams were heated to 800-1000° C. for 10-120 min under reduction gas to remove the oxide layer from the surface of Ni foam. Next, the annealed 3D porous template was placed in tube furnace with feeding the carrier gas. When the temperature of tube furnace reaches to 800-1000° C., the mixture of hydrocarbon and carrier gas was introduced into the tube furnace for 2-30 minutes with the volume ratio of 260-500 sccm:0-100 sccm (in volume) to grow carbon nanospheres. When the growth of carbon nanospheres is finished, the heating process is stopped. The hydrocarbon gas is shut down and the carrier gas is maintained to flow. The products can be taken out until the temperature decreases to room temperature.

The said reduction gas can be $H_2$ or CO or their combinations with Ar.

The carrier gas can be selected from $N_2$, Ar, preferably Ar.

The hydrocarbon compounds can be selected from $CH_4$, $C_2H_6$, $C_3H_8$, $C_4H_{10}$, $C_2H_4$, $C_3H_6$, $C_2H_2$, $C_6H_6$ and $C_7H_8$ or any combinations thereof, preferably $C_2H_2$.

The volume ratio of hydrocarbon compounds and carrier gas is of ((260-500 sccm):(0-100 sccm)).

The deposition temperature is 800-1000° C., preferably 880-920° C., more preferably 900° C. The said growth time of carbon nanosphere is 2-30 min, preferably 3-8 min, more preferably 5 min.

The said carbon nanospheres comprise graphitic sheets with the onion-like spherical structure; and the diameter of said carbon nanospheres is 500-2000 nm, preferably 800-1200 nm.

The present invention further relates to high-security anode for metal-based secondary battery. The metal can be, Li, Na and Mg and the combination thereof them. The metal is loaded into said 3D porous current collector modified by carbon nanospheres.

In addition, a metal-based secondary battery with the said anode, and the application of metal-based secondary battery for the devices with high security and long lifespan is also provided in the present invention.

The present invention further relates to a lithium metal secondary battery, which comprises the said modified current collector and metal loads into said current collector as anode according to the present invention.

The anode is consisted of few percent of Li % excess than the cathode.

The excess amount may be ranged from 1-20%, preferably 2-10%, more preferably 5%.

BRIEF DESCRIPTION OF THE DRAWINGS

The foregoing and other objects, features, and advantages of the invention will be apparent from the following more particular description of preferred embodiments as illustrated in the accompanying drawings, in which.

EMBODIMENT

The following non-limiting examples illustrate various features and characteristics of the present invention, which is not to be construed as limited thereto. The listed synthesis methods are general process, reagent and materials are commercial products unless particular statement.

Embodiment 1

Figure 1:
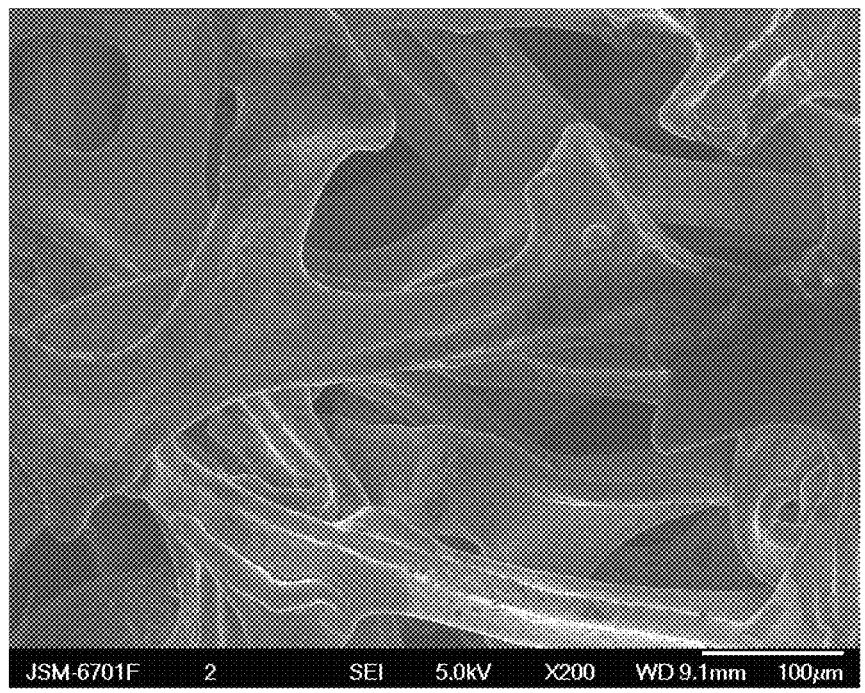
FIG. 1 is a Scanning Electron Microscopy (SEM) image of bare Ni foam of the present invention.
Figure 2:
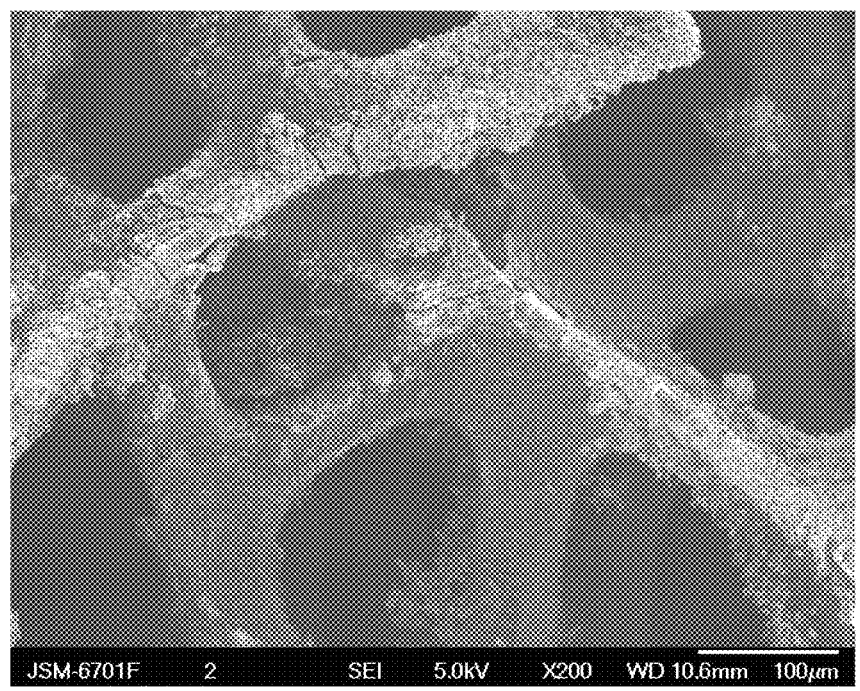
FIG. 2 is a SEM image at low magnitude of carbon nanospheres modified current collector according to embodiment 1 of the present invention.
Figure 3:
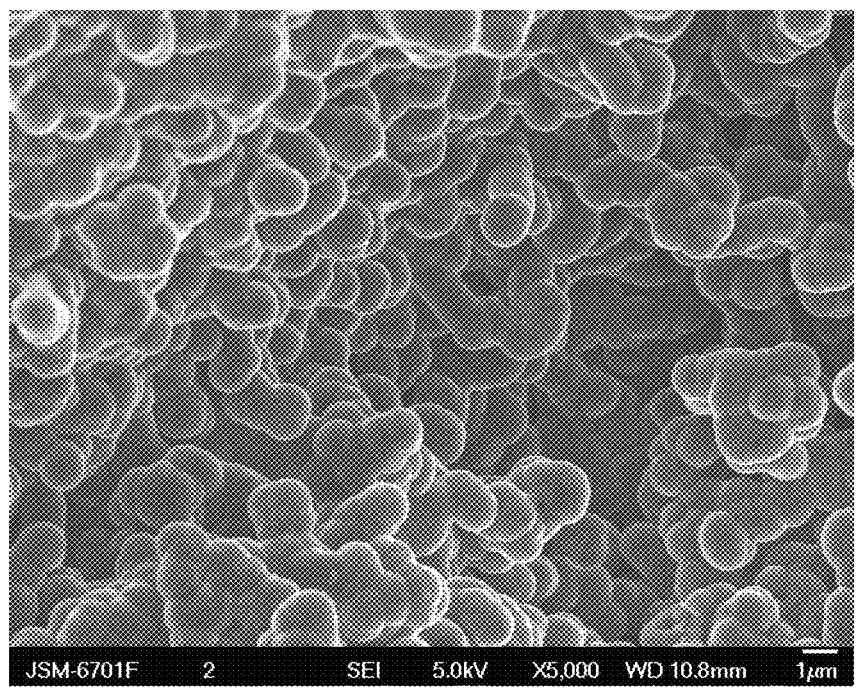
FIG. 3 is a SEM image at high magnitude of carbon nanospheres modified current collector according to embodiment 1 of the present invention.
Figure 4:
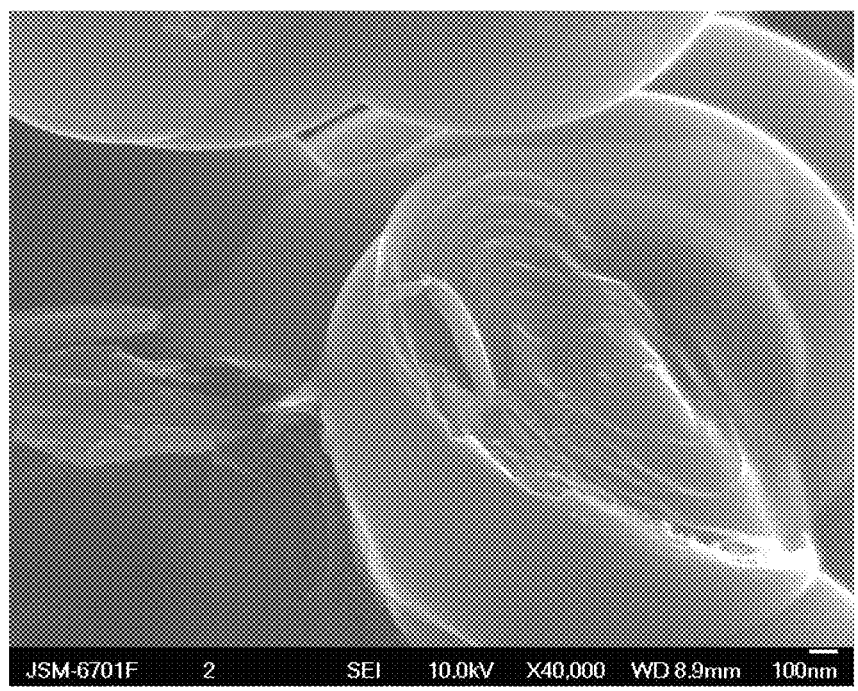
FIG. 4 is a cross-sectional SEM image of carbon nanospheres modified current collector according to embodiment 1 of the present invention.

(1) Preparation of Carbon Nanospheres Modified 3D Porous Material
  (a) The commercial Ni foams were first washed and dried. Then the dried Ni foams were annealed to 900° C. for 30 min under the reductive H$_2$/Ar mixture to remove the oxide layer from the surface of Ni foam. FIG. 1 shows a Scanning Electron Microscopy SEM image of bare Ni foam. The Ni foam has a 3D porous structure with the pore size is about 50-150 μm.
  (b) The annealed Ni foam was placed in the CVD tube furnace. The mixture of acetylene (C$_2$H$_2$) and Ar (400 sccm:25 sccm in volume ratio) was introduced into the quartz tube at 900° C. for 5 minutes to prepare carbon nanospheres modified Ni foam, the deposited mass of carbon is about 1-10 mg/cm$^2$. FIG. 2 shows that the scaffold of Ni foam is totally covered with carbon nanospheres. FIG. 3 shows the SEM image of obtained carbon nanospheres at high magnitude. As shown in FIG. 3, the obtained carbon materials are of spherical structure, and the average diameter of carbon sphere is about 1200-1500 nm. FIG. 4 shows the cross-sectional SEM image of one carbon nanosphere in FIG. 3. From FIG. 4, we can observe that carbon sphere exhibits onion-like structure originated from the self-assemble of graphite sheets.

(2) Preparation of Li Anode with Carbon Nanospheres Modified 3D Porous Current Collector The prepared carbon nanosphere modified 3D current collector served as the cathode and metallic lithium as the anode for plating 2 mA h cm$^{-2}$ of Li.

Figure 5:
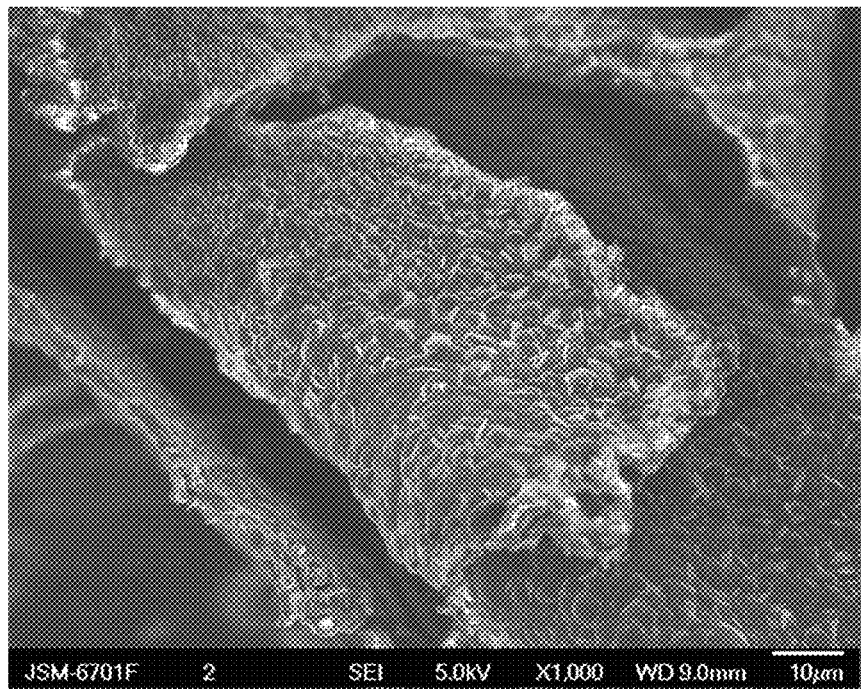
FIG. 5 is a SEM image of carbon nanospheres modified current collector with a lithium load amount of 2 mA h cm$^{-2}$ at low magnitude according to the invention.
Figure 6:
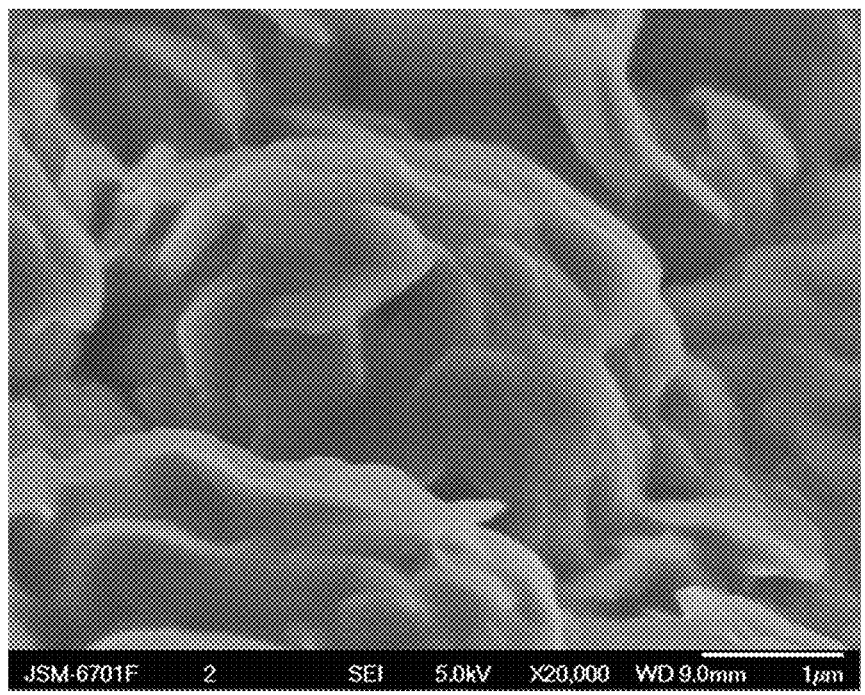
FIG. 6 is a SEM image of carbon nanosphere modified current collector with loading 2 mA h cm$^{-2}$ of Li at high magnitude according to embodiment 1 of the present invention.

FIG. 5 shows that on the carbon nanosphere modified Ni foam, Li tends to nucleate between the graphite spaces of the carbon spheres and then extends to the outer surface of the carbon spheres with petal-shaped structure. No Li dendrites grow along the scaffold of 3D porous Ni foam. FIG. 6 shows the SEM image of obtained carbon nanospheres (shown in FIG. 5) at high magnitude. Li grows with the sheet morphology and further coats the carbon nanospheres without filament structure.

(3) Li Metal Secondary Battery with the Said Anode

Li metal secondary battery comprising with the said anode, a cathode and an electrolyte is provided.

In this embodiment, to test its security and cycling performance, lithium disks were used as counter electrode. The electrochemical performance of 3D porous current collector modified by carbon nanospheres was tested by assembling the said half cell with the said electrolyte.

(4) Electrochemical Performance of Li Metal Secondary Battery

Figure 7:
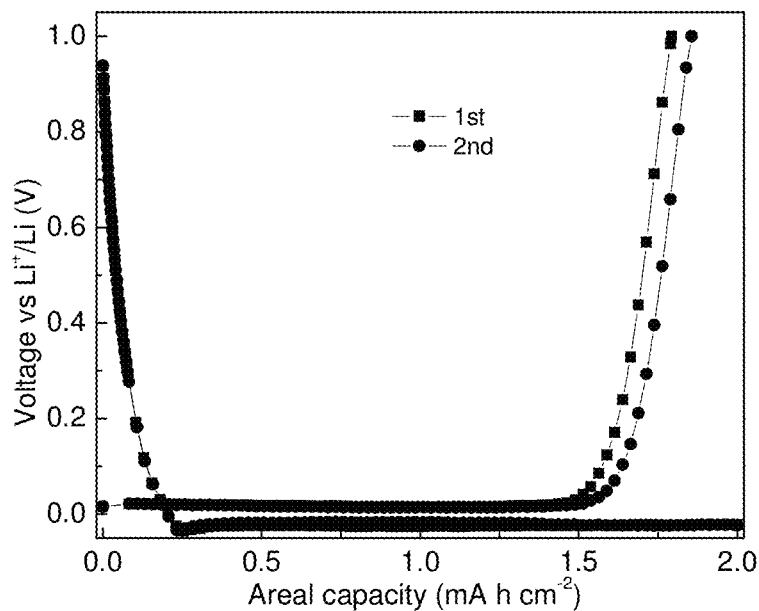
FIG. 7 is a plot showing the discharge-charge curves of the said anode comprising modified current collector for the first three cycles at a discharge-charge rate of 0.5 mA cm$^{-2}$ with a lithium load amount of 2 mA h cm$^{-2}$ according to embodiment 1 of the present invention.
Figure 8:
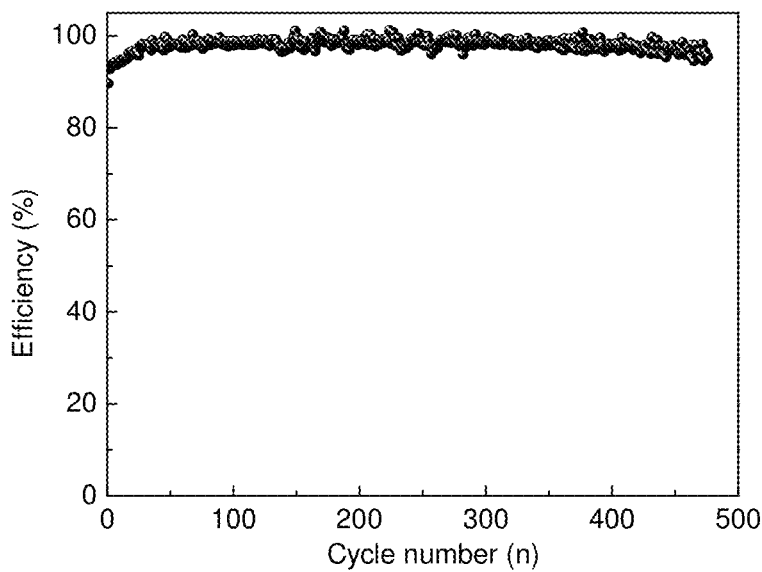
FIG. 8 is a plot showing the long-term cycling performance of the said anode comprising modified current collector at a discharge-charge rate of 0.5 mA cm$^{-2}$ with a lithium load amount of 2 mA h cm$^{-2}$ according to embodiment 1 of the present invention.

Galvanstatic discharge/charge test was performed for the said batteries. The areal capacity of 2 mA h cm$^{-2}$ was provided. The testing temperature is 25° C. FIG. 7 shows the discharge-charge curves of Li anode comprising 3D porous current collector modified by carbon nanosphere in embodiment 1 at the current density of 0.5 mA cm$^{-2}$. As shown in FIG. 7, the Coulombic efficiency of Li stripping/depositing is about 90% at the first cycle and quickly increased to 99% after two cycles. After approximately 500 cycles, the voltage remained stable with small voltage hysteresis, as shown in FIG. 8.

Figure 9:
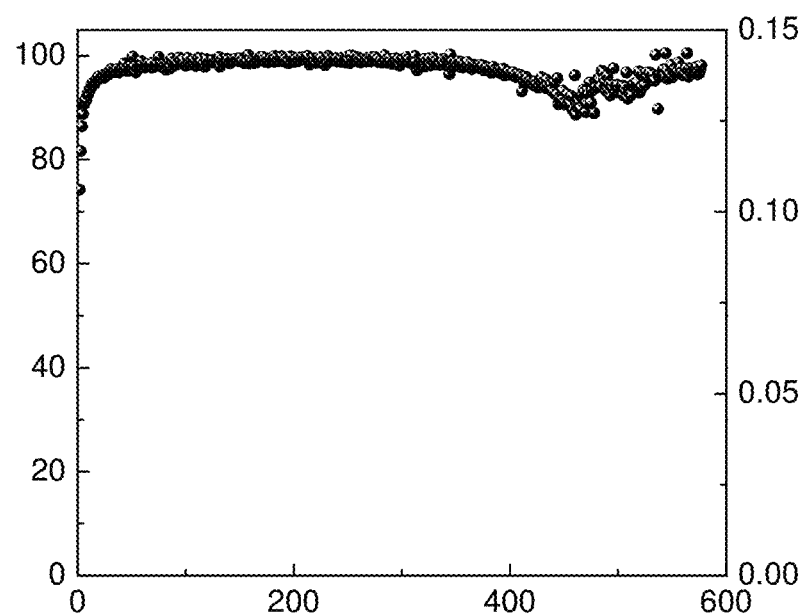
FIG. 9 is a plot showing the long-term cycling performance at a discharge-charge rate of 1 mA cm$^{-2}$ with a lithium load amount of 2 mA h cm$^{-2}$ according to embodiment 1 of the present invention.

FIG. 9 displays the long-term cycling performance of the obtained coin cell in embodiment 1 at a discharge-charge rate of 1 mA cm$^{-2}$ with a lithium load amount of 2 mA h cm$^{-2}$. The Coulombic efficiency of the Li metal working electrode with carbon spheres layers is maintained at 98% for more than 600 cycles, demonstrate superior rate capability.

Figure 10:
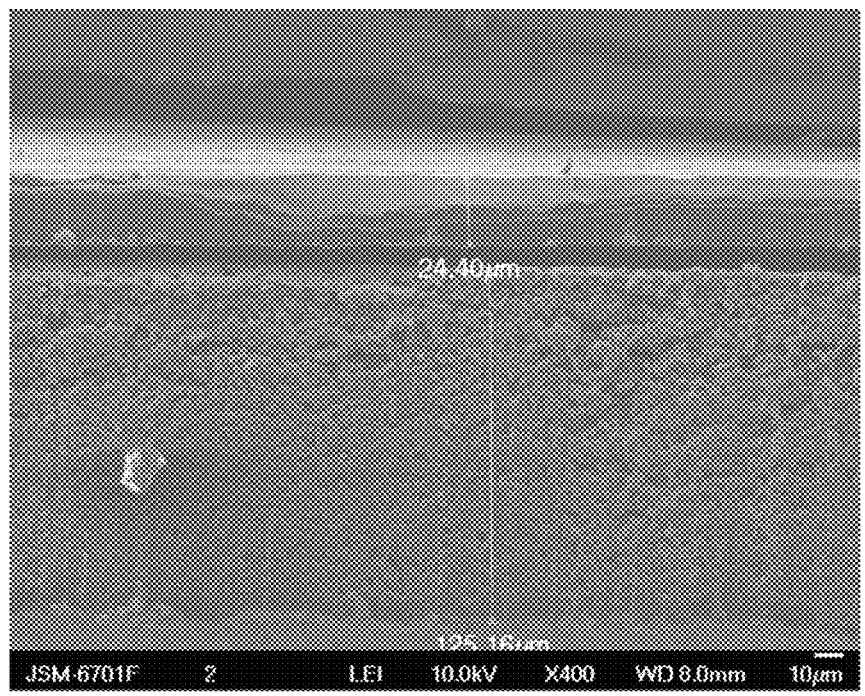
FIG. 10 is a cross-sectional view SEM image of the lithium iron phosphate (LiFePO$_4$) electrode according to embodiment 1 of the present invention.
Figure 11:
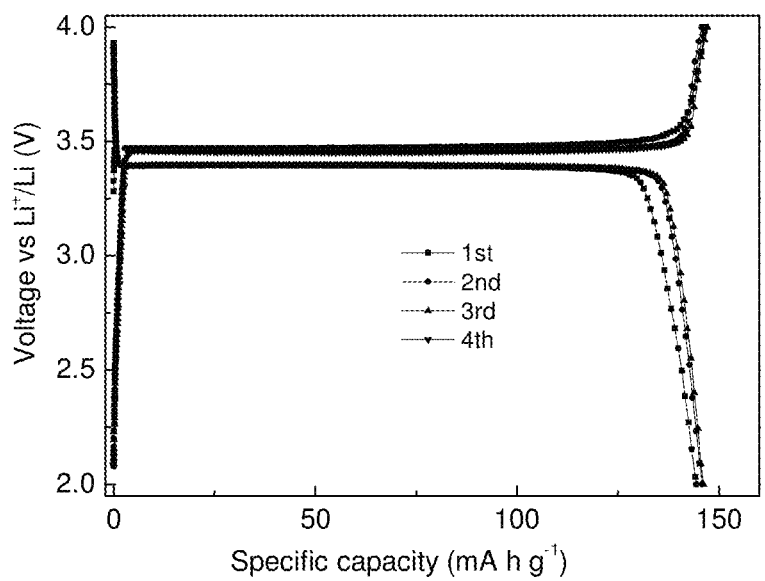
FIG. 11 is a plot showing the discharge-charge curve of the LiFePO$_4$ electrode for the first three cycles at a discharge-charge rate of 0.2 C according to embodiment 1 of the present invention.
Figure 12:
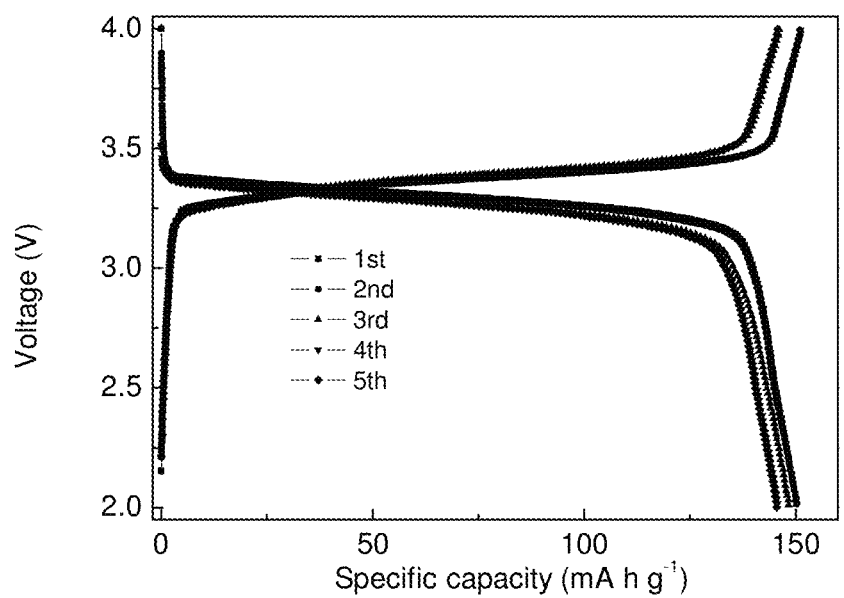
FIG. 12 is a plot showing the discharge-charge curves of the full cell with the Lithium iron phosphate as cathode and carbon nanospheres modified current collector with metal lithium loaded into it as anode for the first five cycles at a discharge-charge rate of 0.2 C according to embodiment 1 of the present invention. Wherein, the ratio of the capacity of Li to the capacity of LiFePO$_4$ is 1.05:1.
Figure 13:
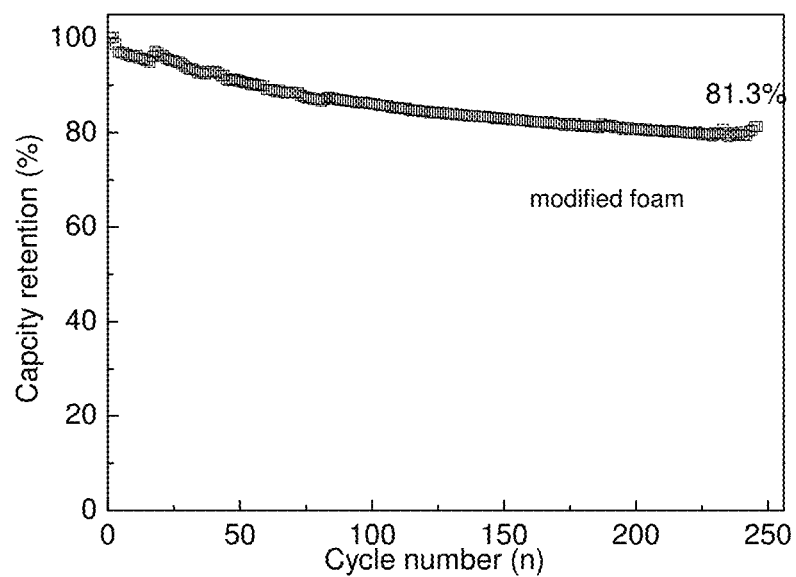
FIG. 13 is a plot showing the cycling performance of the assembled full cell at a discharge-charge rate of 0.2 C according to embodiment 1 of the present invention. Wherein, the ratio of the capacity of Li to the capacity of LiFePO$_4$ is 1.05:1.

To test the modified anode in a practical Li metal secondary battery, we assemble a full cell with LiFePO$_4$ as cathode coupled Li-modified Ni foam as anode. The loading mass of the LiFePO$_4$ is approximately 8 mg cm$^{-2}$, corresponding to the average electrode thickness of 126 μm. The areal capacity of LiFePO$_4$ is of 1.25 mA h cm$^{-2}$ as shown in FIG. 10. FIG. 11 shows the discharge-charge curve of the LiFePO$_4$ electrode for the first three cycles at a discharge-charge rate of 0.2 C as obtained in embodiment 1. The LiFePO$_4$ electrode delivered a reversible capacity up to 146 mA h g$^{-1}$ and with an output discharge voltage of 3.4 V. FIG. 12 is a plot showing the discharge-charge curves of the full cell with the Lithium iron phosphate as cathode and carbon nanospheres modified current collector with metal lithium loaded into it as anode for the first five cycles at a discharge-charge rate of 0.2 C according to embodiment 1 of the present invention. Wherein, the ratio of the capacity of Li to the capacity of LiFePO$_4$ is 1.05:1. During the initial five cycles, the cathode shows a high discharge capacity of 150 mA h g$^{-1}$ with a high voltage output of approximately 3.35 V. After 250 cycles, the assembled full cell could still deliver a reversible capacity of 122 mA h g$^{-1}$, corresponding to a capacity retention of 81.3% (FIG. 13).

Embodiment 2

The operation of embodiment 1 was repeated except that the deposition step. C$_2$H$_4$ was selected as the hydrocarbon gas. And the volume ratio of C$_2$H$_4$ to carrier gas is 340 sccm:50 sccm. The deposition process maintain at 950° C. for 4 minutes. The deposited carbon materials demonstrated uniform distribution and the deposition amount is about 1-6 mg/cm$^2$. The average diameter of carbon sphere is about 1100-1400 nm. After plating 2 mA h cm$^{-2}$ of Li onto the modified current collector, the initial Coulombic efficiency of Li stripping/depositing is of 85% and then quickly increased to 98.5% after two cycles.

Embodiment 3

The operation of embodiment 1 was repeated except that the deposition step. C$_7$H$_8$ was selected as the hydrocarbon gas and the volume ratio of $C_7H_8$ to carrier gas is 320 sccm:25 sccm. The deposition process maintain at 1000° C. for 10 minutes. The deposited carbon materials demonstrated uniform distribution and the deposition amount is about 1-10 mg/cm². The average diameter of carbon sphere is about 1000-1300 nm. After plating 2 mA h cm⁻² of Li onto the modified current collector, the initial Coulombic efficiency of Li stripping/depositing is of 82% and then quickly increased to 98% after two cycles.

Embodiment 4

The operation of embodiment 1 was repeated except that the deposition step. $CH_4$ was selected as the hydrocarbon gas and the volume ratio of $CH_4$ to carrier gas is 300 sccm:30 sccm. The deposition process maintain at 1000° C. for 6 minutes. The deposited carbon materials demonstrated uniform distribution and the deposition amount is about 1-5 mg/cm². The average diameter of carbon sphere is about 1000-1300 nm. After plating 2 mA h cm⁻² of Li onto the modified current collector, the initial Coulombic efficiency of Li stripping/depositing is of 80% and then quickly increased to 97.5% after two cycles.

Embodiment 5

The operation of embodiment 1 was repeated except that the deposition step. $C_2H_2$ was selected as the hydrocarbon gas and the volume ratio of $C_2H_2$ to carrier gas is 280 sccm:25 sccm. The deposition process maintain at 800° C. for 4 minutes. The deposited carbon materials demonstrated uniform distribution and the deposition amount is about 1-5 mg/cm². The average diameter of carbon sphere is about 1000-1200 nm. And the deposited carbons demonstrated uniform distribution. After plating 2 mA h cm⁻² of Li onto the modified current collector, the initial Coulombic efficiency of Li stripping/depositing is of 78% and then quickly increased to 97% after two cycles.

Embodiment 6

The operation of embodiment 1 was repeated except that the deposition step. $C_2H_2$ was selected as the hydrocarbon gas and the volume ratio of $C_2H_2$ to carrier gas is 260 sccm:25 sccm. The deposition process maintain at 900° C. for 3 minutes. The deposited carbon materials demonstrated uniform distribution and the deposition amount is about 1-3 mg/cm². The average diameter of carbon sphere is about 900-1000 nm. After plating 2 mA h cm⁻² of Li onto the modified current collector, the initial Coulombic efficiency of Li stripping/depositing is of 70% and then quickly increased to 96% after two cycles.

Controlled Sample 1

The operation of embodiment 1 was repeated except that the deposition step. $C_2H_2$ was selected as the hydrocarbon gas and the volume ratio of $C_2H_2$ to carrier gas is 240 sccm:20 sccm. The deposition process maintain at 900° C. for 5 minutes. The deposited carbon materials were composed of few carbon nanotubes and most parts of carbon spheres. The deposited carbon materials demonstrated uniform distribution. And the intertwined carbon nanotubes demonstrated uniform distribution with no orientation. The mean diameter of carbon nanotube is of 800 nm and the average diameter of carbon sphere is about 1000-1200 nm. The deposition amount is about 1-6 mg/cm². After plating 2 mA h cm⁻² of Li onto the modified current collector, the initial Coulombic efficiency of Li stripping/depositing is of 69% and then quickly increased to 95% after two cycles.

Controlled Sample 2

The operation of embodiment 1 was repeated except that the deposition step. $C_2H_2$ was selected as the hydrocarbon gas and the volume ratio of $C_2H_2$ to carrier gas is 150 sccm:20 sccm. The deposition process maintain at 800° C. for 10 minutes. The deposited carbon materials were composed of half parts of carbon nanotubes and half parts of carbon spheres. The mean diameter of carbon nanotubes is of 500 nm and the average diameter of carbon sphere is about 700 nm. The deposition amount is about 1-6 mg/cm². After plating 2 mA h cm⁻² of Li onto the modified current collector, the initial Coulombic efficiency of Li stripping/depositing is of 68% and then quickly increased to 91% after two cycles.

Controlled Sample 3

The operation of embodiment 1 was repeated except that the deposition step. $C_2H_2$ was selected as the hydrocarbon gas and the volume ratio of $C_2H_2$ to carrier gas is 100 sccm:20 sccm. The deposition process maintain at 820° C. for 8 minutes. The deposited carbon materials were composed of a majority of carbon nanotubes and a few amounts of carbon spheres. And the intertwined carbon nanotubes demonstrated uniform distribution with no orientation. The average diameter of carbon nanotubes is of 150 nm and carbon sphere is about 150 nm. The deposition amount is about 1-8 mg/cm². After plating 2 mA h cm⁻² of Li onto the modified current collector, the initial Coulombic efficiency of Li stripping/depositing is of 65% and then quickly increased to 88% after two cycles.

Controlled Sample 4

Figure 14:
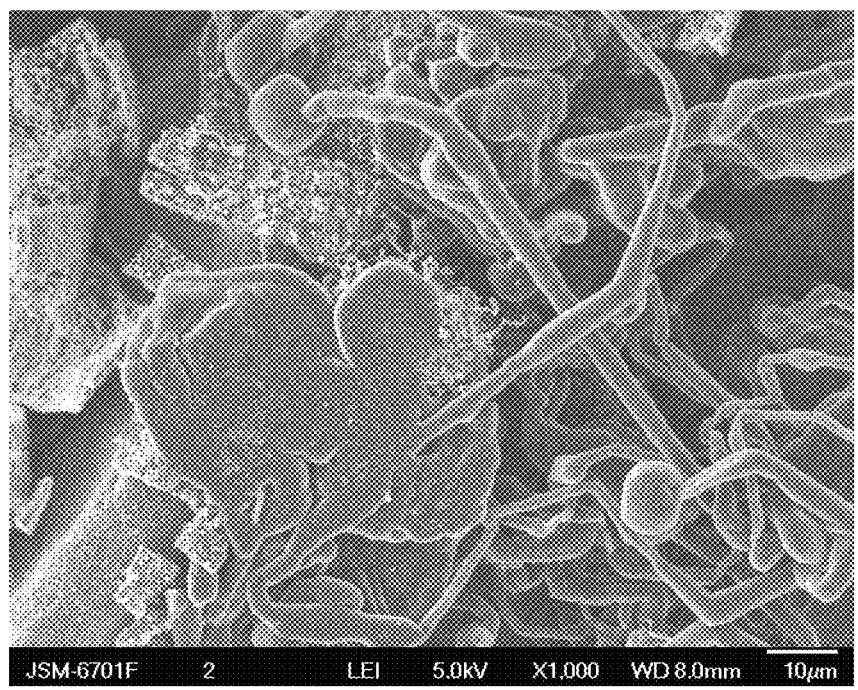
FIG. 14 is a SEM image of carbon nanotubes modified current collector with loading 2 mA h cm$^{-2}$ of Li according to controlled sample 4 of the present invention.

The operation of embodiment 1 was repeated except that the deposition step. The deposition process maintain at 650° C. for 10 minutes. The volume ratio of $C_2H_2$ to carrier gas is 40 sccm:20 sccm. The surface of modified 3D porous Ni foam was composed of carbon nanotubes. The average diameter of carbon nanotubes is of 50-200 nm. FIG. 14 shows that after plating 2 mA h cm⁻² of Li onto the 3D porous current collector modified by carbon nanotubes, the filament Li dendrites can be detected on the carbon nanotubes modified Ni foam, and the Coulombic efficiency of Li stripping/depositing is maintained at 80% after two cycles. After 50 stripping/plating cycles, the long filament Li could pierce the separator and thus lead to short-circuiting.

Controlled Sample 5

The operation of embodiment 1 was repeated except that the deposition step. $CH_4$ was selected as the hydrocarbon gas and the volume ratio of $CH_4$ to carrier gas is 150 sccm:50 sccm. The deposition process maintain at 1000° C. for 10 minutes. The deposited carbon materials were composed of graphene. The average thickness of graphene is of 5-10 atoms. After plating 2 mA h cm⁻² of Li onto 3D porous current collector modified by graphene, a filament Li dendrite can be detected on both sides of graphene modified Ni foam, and the Coulombic efficiency of Li stripping/depositing is maintained at 90% after two cycles. After 60 cycles, the long filament Li could pierce the separator and lead to short-circuiting.

Controlled Sample 6

Figure 15:
FIG. 15 is a SEM image of bare Ni foam with loading 2 mA h cm$^{-2}$ of Li according to controlled sample 6.
Figure 16:
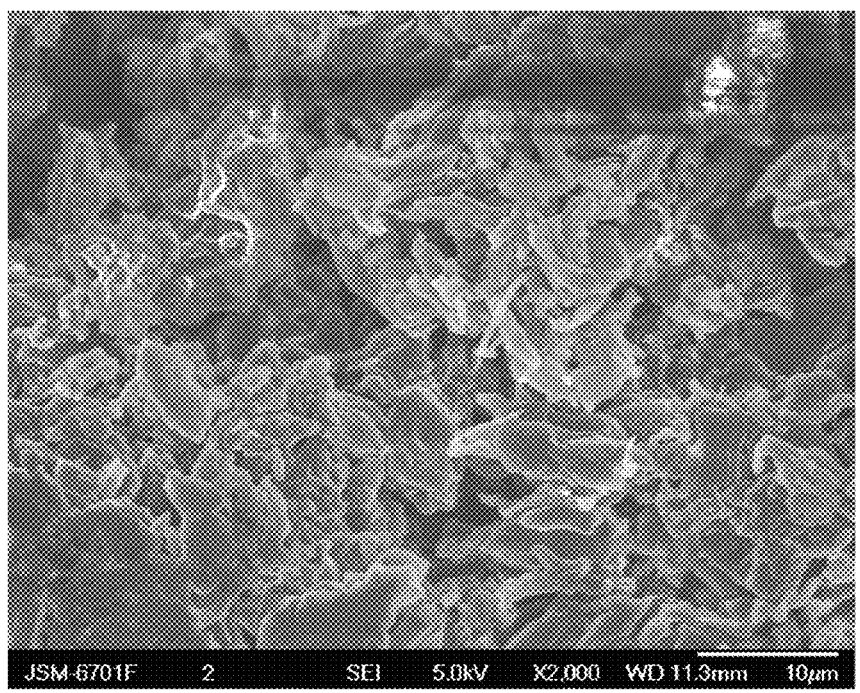
FIG. 16 is a SEM image at high magnitude of bare Ni foam with loading 2 mA h cm$^{-2}$ of Li according to controlled sample 6.
Figure 17:
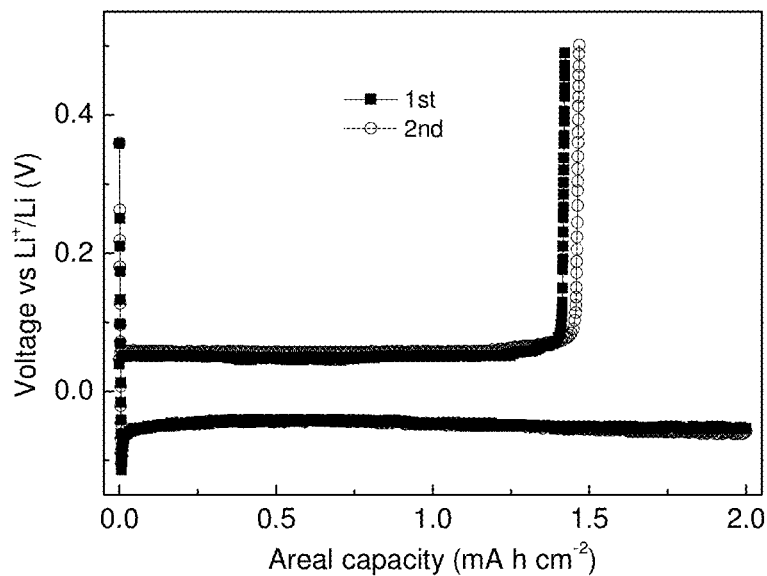
FIG. 17 is a plot showing the discharge-charge curves of the said anode comprising bare Ni foam for the first three cycles at a discharge-charge rate of 0.5 mA cm$^{-2}$ with a lithium load amount of 2 mA h cm$^{-2}$ according to controlled sample 6 of the present invention.
Figure 18:
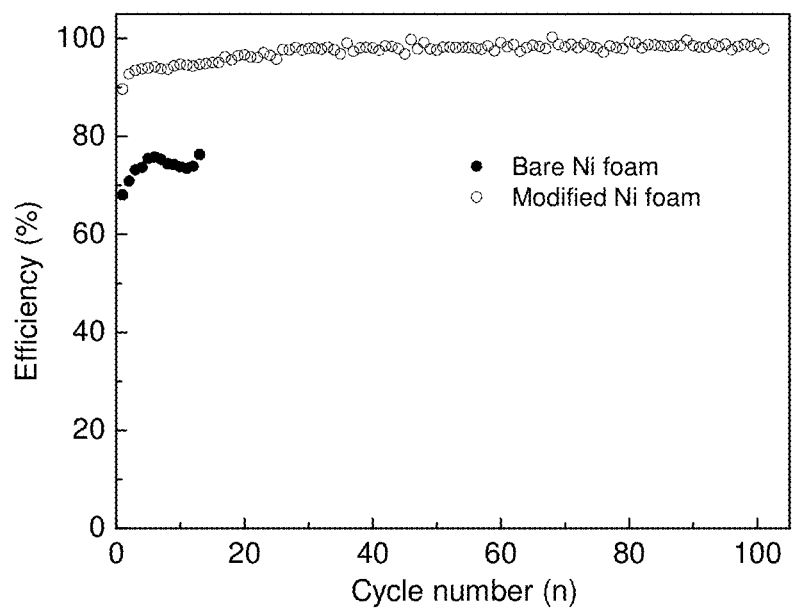
FIG. 18 is a graph of Coulombic efficiency comparison between embodiment 1 and controlled sample 6.

The operation of embodiment 1 was repeated except that the current collector to load metal Li is commercial bare Ni foam with a porous diameter of 100 μm. After plating 2 mA h cm$^{-2}$ of Li onto the bare Ni foam current collector, the Coulombic efficiency of Li stripping/depositing for bare Ni foam is of 75% after two cycles. From the SEM image of anode in FIG. 15, Li grows firstly on the Ni foam skeleton and gradually fills the pore of the porous Ni foam. FIG. 16 shows the high magnitude of FIG. 15. As shown in FIG. 16, the morphology of deposited Li exhibits filament and moss-like dendrite. Due to the large pore of Ni foam, large amounts of deposited Li stripped from the scaffold of Ni foam during cycling process and became "dead-Li". FIG. 17 is a plot showing the discharge-charge curves of the said Li anode comprising bare Ni foam at 0.5 mA cm$^{-2}$ for the controlled sample 6. FIG. 18 is a graph of Coulombic efficiency comparison at 0.5 mA cm$^{-2}$ between embodiment 1 and the controlled sample 6. As shown in FIG. 18, Li anode on the bare Ni foam demonstrates low coulombic efficiency (70% for the first cycle) and poor cycling stability (75% for the following cycles). On the contrast, Li anode on the Ni foam modified by carbon nanosphere displays high initial coulombic efficiency of 90% and maintains at above 99% during cycling.

Figure 19:
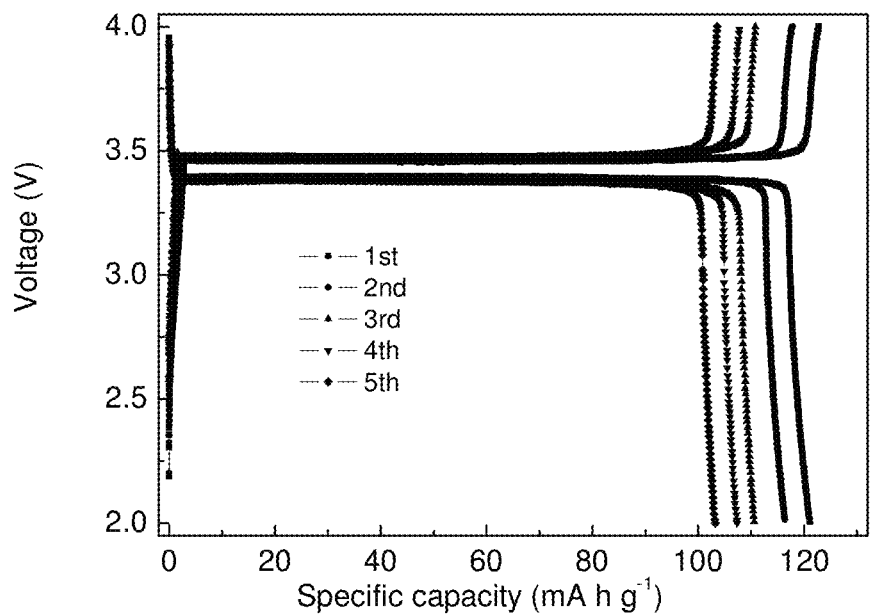
FIG. 19 is a plot showing the discharge-charge curves of the full cell with Lithium iron phosphate as cathode and bare Ni foam with metal lithium loaded into it as anode for the first five cycles at a discharge-charge rate of 0.2 C. Wherein, the ratio of the capacity of Li to the capacity of LiFePO$_4$ is 1.05:1 according to controlled sample 6 of the present invention.
Figure 20:
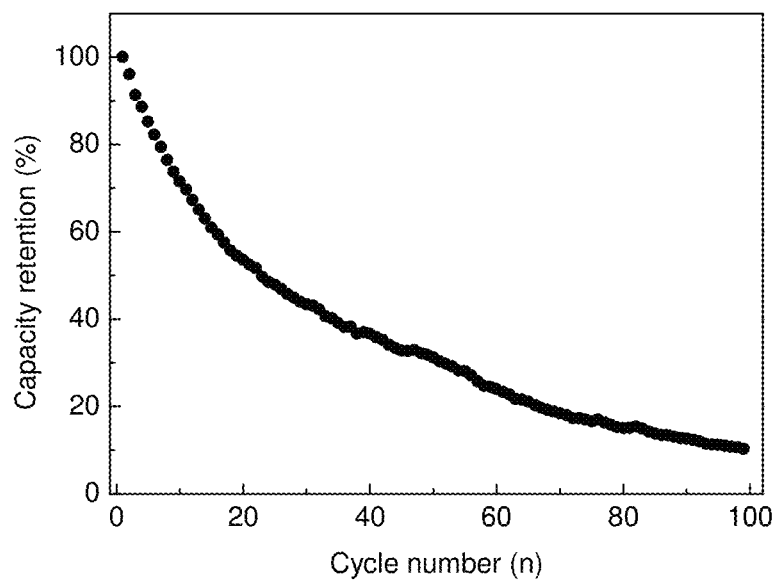
FIG. 20 is a plot showing the cycling performance of the assembled full cell at a discharge-charge rate of 0.2 C according to controlled sample 6 of the present invention. Wherein, the ratio of the capacity of Li to the capacity of LiFePO$_4$ is 1.05:1.

To test the modified anode in a full cell, we assemble a full cell with LiFePO$_4$ as cathode coupled Li-bare Ni foam as anode. The loading mass of the LiFePO$_4$ is approximately 8 mg cm$^{-2}$, corresponding to the average electrode thickness of 126 μm. FIG. 19 is a plot showing the discharge-charge curves of the full cell with the Lithium iron phosphate as cathode and metal lithium loaded into the bare current collector as anode for the first five cycles at a discharge-charge rate of 0.2 C according to the controlled sample 6. Wherein, the ratio of the capacity of Li to the capacity of LiFePO$_4$ is 1.05:1. During the initial five cycles, the cathode shows low discharge capacity of 120 mA h g$^{-1}$ with serious capacity decay. After 100 cycles, the assembled full cell delivers a reversible capacity of 12 mA h g$^{-1}$, corresponding to a capacity retention of 10% (FIG. 20).

Controlled Sample 7

The operation of embodiment 1 was repeated except that the current collector is planar Ni foil to load metal Li. After plating 4 mA h cm$^{-2}$ of Li onto the planar Ni foil current collector, the stripping/plating efficiency of Li is about 50%. The pore and scaffold of Ni was covered with filament and pan-cake Li dendrites. The orientated Li dendrite grows along with one direction, which will lead to short-circuiting. After several cycles, the plating/stripping voltage became random oscillation.

The invention claimed is:

1. A carbon nanospheres-modified current collector for lithium metal-based batteries, comprising:
    a porous current collector serving as a substrate, and
    carbon nanospheres loaded on the porous current collector,
    wherein the carbon nanospheres have a layered structure assembled from a plurality of curled graphite sheets, and
    wherein the carbon nanospheres have an average diameter of 500-2000 nm, and
    wherein the porous current collector is a Ni foam, a Cu foam, or an Al foam,
    wherein the carbon nanospheres-modified current collector is made according to a process that comprises the following steps:
        washing and drying the porous current collector;
        annealing the dried porous current collector at 800-1000° C. for 10-120 min in a reducing atmosphere;
        placing the annealed porous current collector in a reactor to carry out chemical vapor deposition in the presence of a gas mixture containing a hydrocarbon and a carrier gas for 2-30 minutes at 800-1000° C. to obtain the carbon nanospheres-modified current collector,
        wherein a volume ratio between the hydrocarbon and the carrier gas is in the range of (300-400): (25-50);
        maintaining the modified porous current collector in a flow of the carrier gas; and
        removing the carbon nanospheres-modified current collector from the reactor at room temperature.

2. The modified current collector according to claim 1, wherein the average diameter of the carbon nanospheres is of 800-1500 nm.

3. The carbon nanospheres-modified current collector according to claim 1, wherein an amount of carbon nanospheres on the porous current collector is about 1-10 mg/cm$^2$.

4. An anode for a metal secondary battery comprising a carbon nanospheres-modified current collector according to claim 1 and Li, Na, Mg or combination thereof loaded on the said carbon nanospheres-modified current collector.

5. A metal secondary battery comprising an anode according to claim 4, said metal secondary battery is a lithium battery or a sodium battery.

6. A storage device comprising an anode according to claim 4.

7. A metal secondary battery comprising an anode, a cathode, and an electrolyte, wherein said anode comprises the carbon nanospheres-modified current collector according to claim 1, and wherein a content of Li in the anode is 1-20% more than a content of Li in the cathode.

* * * * *